(12) United States Patent
Satomura et al.

(10) Patent No.: US 11,682,511 B2
(45) Date of Patent: Jun. 20, 2023

(54) ELECTRONIC APPARATUS

(71) Applicant: CANON KABUSHIKI KAISHA, Tokyo (JP)

(72) Inventors: Shogo Satomura, Kanagawa (JP); Yoshikazu Asai, Kanagawa (JP); Takahiro Akimoto, Kanagawa (JP); Sho Nagatsu, Kanagawa (JP); Jun Kamiya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/748,179

(22) Filed: May 19, 2022

(65) Prior Publication Data

US 2022/0392680 A1 Dec. 8, 2022

(30) Foreign Application Priority Data

Jun. 2, 2021 (JP) .............................. JP2021-092764

(51) Int. Cl.
*H01F 7/02* (2006.01)
*H04N 23/60* (2023.01)
(52) U.S. Cl.
CPC ........... *H01F 7/0231* (2013.01); *H04N 23/60* (2023.01)
(58) Field of Classification Search
CPC .................................................. H01F 7/0231
USPC .......................................... 335/229; 396/502
See application file for complete search history.

(56) References Cited

U.S. PATENT DOCUMENTS

| | | | | |
|---|---|---|---|---|
| 4,045,738 A | * | 8/1977 | Buzzell | G01P 3/488 335/229 |
| 5,136,324 A | * | 8/1992 | Tsuboi | G02B 7/10 318/592 |
| 5,331,154 A | * | 7/1994 | Kondo | H04N 25/622 348/E3.021 |
| 11,476,027 B2 | * | 10/2022 | Nagatsu | H01F 7/0242 |

FOREIGN PATENT DOCUMENTS

JP 2020-087672 A 6/2020

* cited by examiner

*Primary Examiner* — Alexander Talpalatski
(74) *Attorney, Agent, or Firm* — Cowan, Liebowitz & Latman, P.C.

(57) ABSTRACT

An electronic apparatus includes a rotatable operation member that can be rotationally operated, a base member, a magnet having alternately magnetized N and S poles and rotatable integrally with the rotatable operation member, and first and second magnetic members disposed so that the magnet is disposed between them in an axial direction of a rotational center axis of the rotatable operation member and having a plurality of comb tooth portions. In the axial direction, the first magnetic member, the magnet, and the second magnetic member are disposed on an opposite side of the base member from the rotatable operation member. A part of an outer circumferential portion of the rotatable operation member is exposed to an outside from an opening provided on an exterior member of the electronic apparatus. The magnet, the first magnetic member, and the second magnetic member are covered with the exterior member.

18 Claims, 6 Drawing Sheets

ELECTRONIC APPARATUS

BACKGROUND OF THE INVENTION

Field of the Invention

The present invention relates to an electronic apparatus that uses magnetism (magnetic force) to give a user an operational feeling of a rotatable operation member and to detect a rotation of the rotatable operation member.

Description of the Related Art

Many electronic apparatuses, such as image pickup apparatuses, are equipped with a rotatable operation member (dial). For example, in an image pickup apparatus, a user can rotationally operate the dial to change a setting value related to imaging and to select a function related to imaging.

Japanese Patent Laid-Open No. ("JP") 2020-87672 discloses a rotatable operation apparatus in which an annular permanent magnet and a magnetic member are overlapped in an axial direction, the annular permanent magnet is attached to and rotatable integrally with a rotatable operation member and has N and S poles alternately magnetized in a rotational direction, and the magnetic member has a plurality of radial comb tooth portions that face a magnetized surface of the permanent magnet.

However, the rotatable operation apparatus disclosed in JP 2020-87672 has a structure in which the magnet and the magnetic member are exposed to an outside of an electronic apparatus, and therefore magnetic dust such as iron powder easily adheres to the magnet and the magnetic member. Moreover, dustproof and drip-proof performance is insufficient.

SUMMARY OF THE INVENTION

The present invention provides an electronic apparatus that includes a rotatable operation member and has good dustproof and drip-proof performance.

An electronic apparatus according to one aspect of embodiments of the present disclosure includes a rotatable operation member that can be rotationally operated, a base member configured to rotatably hold the rotatable operation member, a magnet in which N poles and S poles are alternately magnetized in a rotational direction, the magnet being rotatable integrally with the rotatable operation member, and a first magnetic member and a second magnetic member disposed so that the magnet is disposed between them in an axial direction in which a rotational center axis of the rotatable operation member extends, each of the first magnetic member and the second magnetic member having a plurality of comb tooth portions radially extending outward in a radial direction from a center. In the axial direction, the first magnetic member, the magnet, and the second magnetic member are disposed on an opposite side of the base member from the rotatable operation member. A part of an outer circumferential portion of the rotatable operation member is exposed to an outside from an opening provided on an exterior member of the electronic apparatus. The magnet, the first magnetic member, and the second magnetic member are covered with the exterior member.

Further features of the present invention will become apparent from the following description of exemplary embodiments with reference to the attached drawings.

DESCRIPTION OF THE EMBODIMENTS

Referring now to the accompanying drawings, a description is given of embodiments according to the present invention.

First Embodiment

Figure 1A:
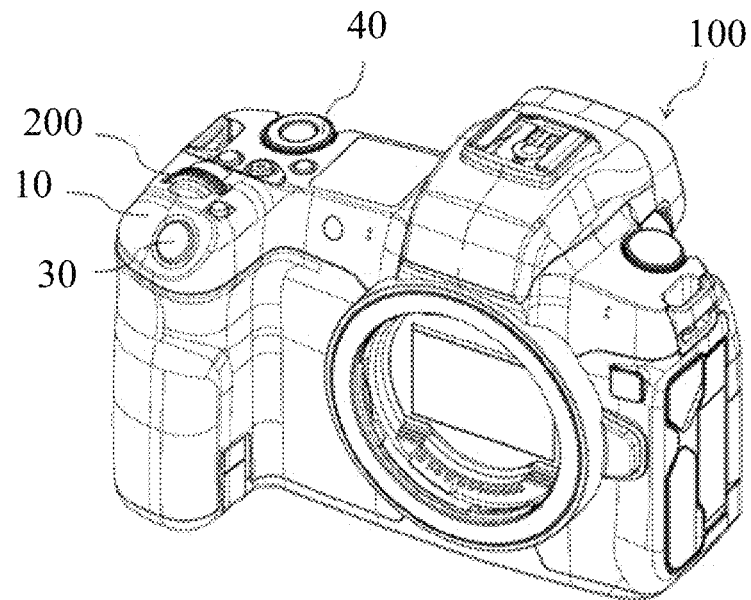
FIGS. 1A and 1B are perspective views of a camera according to a first embodiment.
Figure 1B:
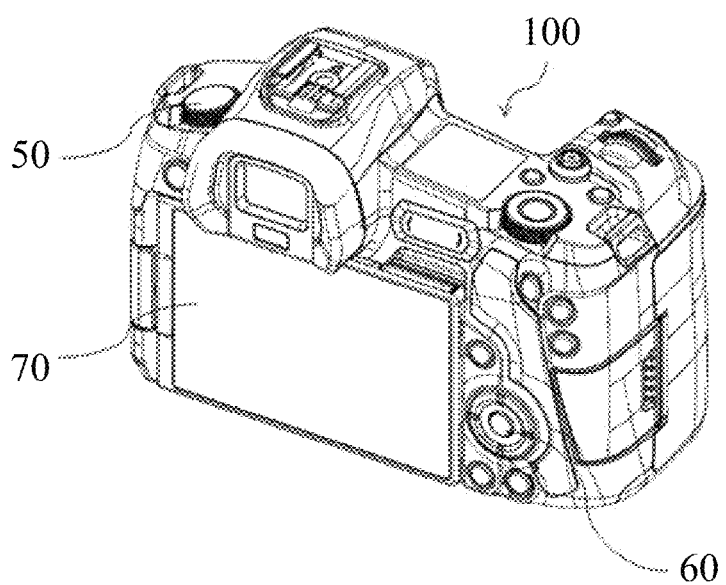

Each of FIGS. 1A and 1B illustrates a digital camera (hereinafter, simply referred to as a camera) 100 as an electronic apparatus (image pickup apparatus) according to the first embodiment of the present invention. FIG. 1A illustrates the camera 100 viewed from a diagonally front side, and FIG. 1B illustrates the camera 100 viewed from a diagonally rear side. An image pickup lens unit (not illustrated) is detachably attached to the camera 100.

A shutter button 30, a main dial 200, and a mode changeover dial 40 are provided on an upper surface of the camera 100. The shutter button 30 is an operation member and a user operates it to instruct imaging. The main dial 200 is a rotatable operation member and the user can rotationally operate it clockwise and counterclockwise so as to change various setting values related to imaging such as a shutter speed and a diaphragm value. The shutter button 30 and the main dial 200 are disposed on an upper surface of a grip portion of the camera 100 at positions such that the user easily operates them with an index finger of a user's right hand holding the grip portion.

The main dial 200 is disposed so that a part of the main dial 200 protrudes (is exposed) in a radial direction from a part around the main dial 200 of a top cover 10 as an exterior member of the camera 100, and therefore the user can easily operate an outer circumference surface of the main dial 200. Hereinafter, a direction in which a rotational center axis of the main dial 200 extends is referred to as an axial direction.

The mode changeover dial 40 is an operation member and the user operates it to change a mode related to imaging. A power switch 50 is provided on the upper surface of the camera 100. The power switch 50 is an operation member operated by the user to turn on or off the power of the camera 100.

An image display unit 70 and a set button 60 are provided on a rear surface of the camera 100. The image display unit 70 includes a display device, such as a TFT liquid crystal display and an organic EL, and displays a menu screen for selecting or changing various setting values and an image captured by imaging. The set button 60 is an operation member operated by the user to determine a selection item on the menu screen.

Figure 2:
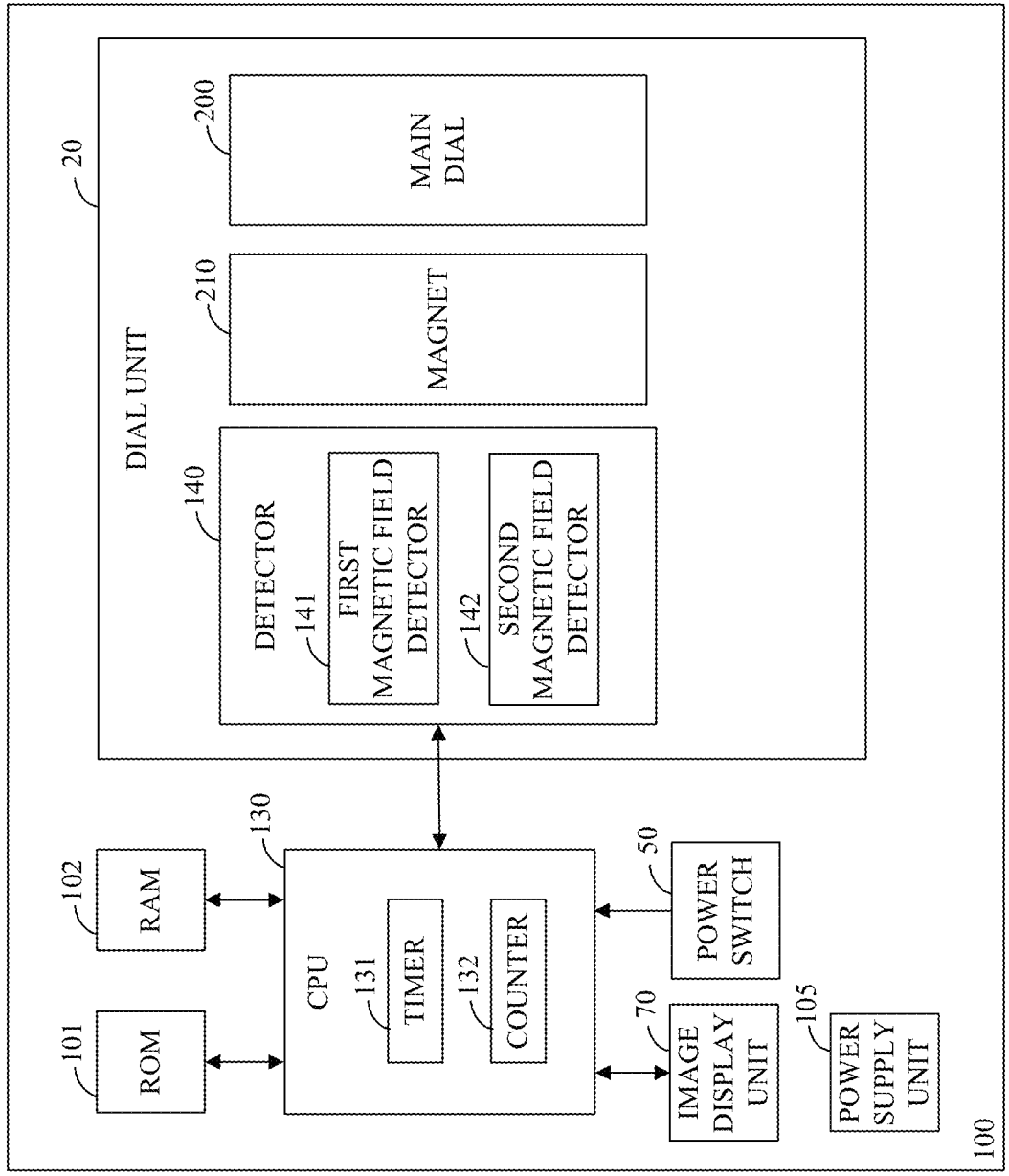
FIG. 2 is a block diagram illustrating a configuration of the camera according to the first embodiment.

FIG. 2 illustrates electrical and magnetic configurations of the camera 100 illustrated in FIGS. 1A and 1B. A description of components described with reference to FIGS. 1A and 1B among components in FIG. 2 are omitted below.

The camera 100 is provided with a ROM 101 that is a non-volatile memory, such as a flash memory, and a RAM 102 that is a volatile memory. The ROM 101 stores a program that operates on a CPU 130. The RAM 102 is used as a buffer for temporarily storing an image captured by imaging and image data acquired by image processing, or is used as a work memory of the CPU 130.

A power supply unit 105 includes a primary battery or a secondary battery, an AC adapter, and the like, and when the power switch 50 described above is operated for turning on power, power is supplied to each unit of the camera 100 directly or via an unillustrated DC-DC converter or the like.

The CPU 130 controls an entire operation of the camera 100. Further, the CPU 130 changes various setting values such as the shutter speed and the diaphragm value according to the operation on the main dial 200 detected by a detector 140 described later, and changes the display on the image display unit 70.

The CPU 130 includes a timer 131 and a counter 132. The timer 131 performs a time measuring operation, and the counter 132 counts the number of operations on the main dial 200 and on the other operation members.

A dial unit 20 as a magnetic force type rotatable operation apparatus includes the above-described main dial 200, a magnet 210, the detector 140, a first magnetic member 220, and a second magnetic member 230. The magnet 210 is a ring-shaped permanent magnet, and in the magnet 210, S poles and N poles are magnetized in the axial direction and are alternate in a circumferential direction at predetermined pitches. The magnet 210 is attached to and rotatable integrally with the main dial 200. When the magnet 210 is rotated by the user rotationally operating the main dial 200, the detector 140 described below detects a change in a magnetic flux density from the magnet 210.

Each of the first magnetic member 220 and the second magnetic member 230 are provided for generating a rotation resistant force of a magnetic force generated between each of them and the magnet 210 which rotates integrally with the main dial 200. This rotation resistant force gives a proper operational feeling (click feeling) to the user rotationally operating the main dial 200.

The detector 140 includes a first magnetic field detector 141 and a second magnetic field detector 142. As each magnetic field detector, a Hall IC sensor, an MR sensor, or the like can be used. An upper threshold and a lower threshold are set for each of the first magnetic field detector 141 and the second magnetic field detector 142. Each of the first magnetic field detector 141 and the second magnetic field detector 142 outputs a detection signal when a detected magnetic flux density exceeds the upper threshold or falls below the lower threshold. The CPU 130 reads the detection signals output from the first magnetic field detector 141 and the second magnetic field detector 142 at predetermined timings and acquires a rotational direction and a rotational amount of the main dial 200.

Figure 3A:
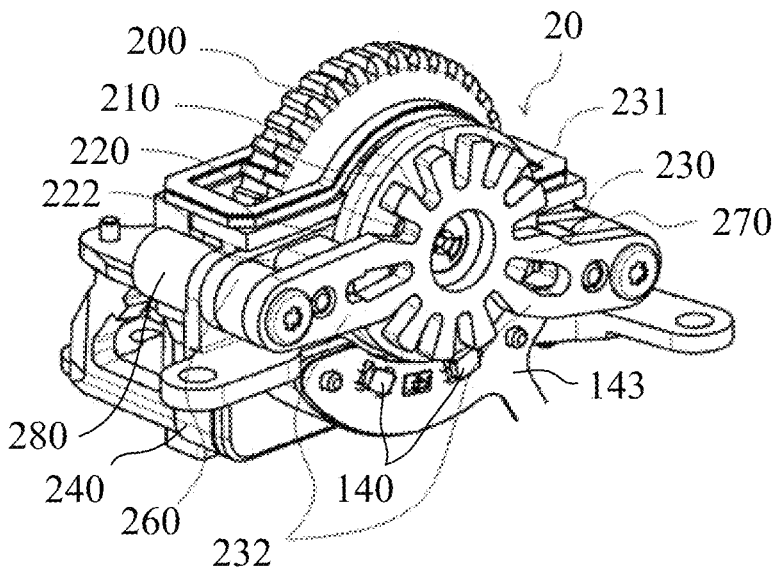
FIGS. 3A and 3B are a perspective view and a sectional view illustrating a main dial unit provided on the camera according to the first embodiment.
Figure 3B:
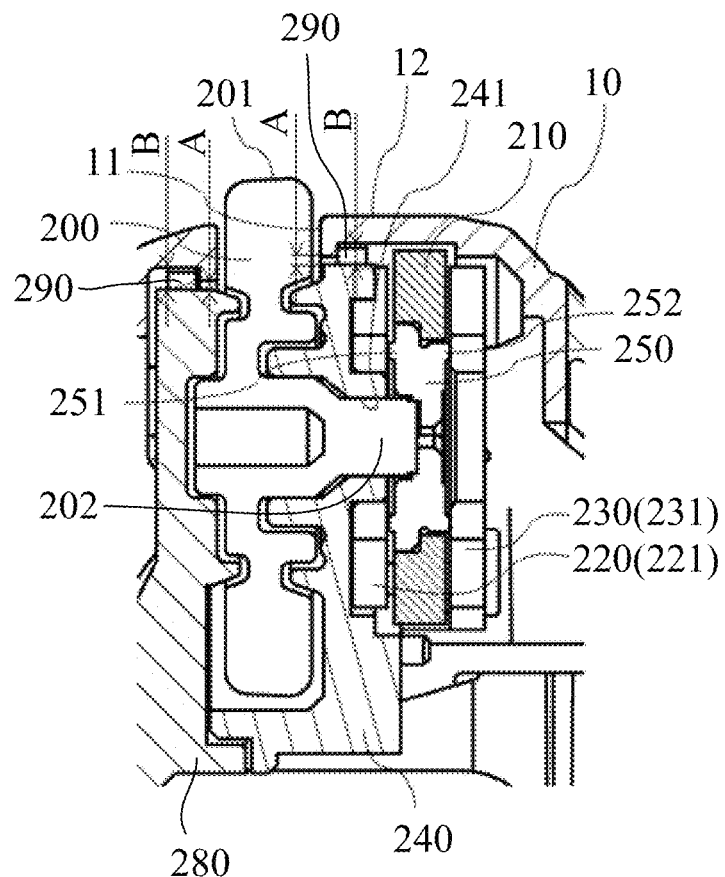

FIG. 3A illustrates a mechanical configuration of the dial unit 20. FIG. 3B illustrates a section of the dial unit 20 along the rotational center axis of the main dial 200. FIG. 3A omits an illustration of the top cover 10 illustrated in FIG. 3B.

The main dial 200 includes an operational surface 201 which is the outer circumferential surface touched by the user when the user operates the main dial 200, and a rotational axis portion 202 which is the rotational center of the main dial 200. The operational surface 201 is a surface parallel to or slightly tilted with respect to the axial direction. The rotational axis portion 202 is rotatably supported by a bearing portion 241 of the base member 240. The rotational axis portion 202 extends so that its tip penetrates the bearing portion 241 of the base member 240 in the axial direction, and a magnet holder 250 is fixed to the tip by adhesion or the like. The magnet 210 is fixed to an outer circumference of the magnet holder 250 by adhesion, insert molding, or the like. As a result, the main dial 200 and the magnet 210 can rotate integrally. Alternatively, a rotational axis portion corresponding to the rotational axis portion 202 may be provided on the magnet holder 250, and the main dial 200 may be attached to the rotational axis portion.

The magnet 210 is disposed between the first magnetic member 220 and the second magnetic member 230 in the axial direction. If the magnet 210 and each of the first magnetic member 220 and the second magnetic member 230 come into direct contact with each other during the rotation of the magnet 210, they are likely to be worn. Thus, a gap formed by a spacer member described below is provided between the magnet 210 and each of the first magnetic member 220 and the second magnetic member 230.

The first magnetic member 220 and the second magnetic member 230 have the same shape and respectively have comb tooth portions 221 and 231 extending radially outward in the radial direction from the center, and the number and pitches of each of the comb tooth portions 221 and 231 are the same as the number and pitches of the poles of the magnet 210. When a positional relationship in the rotational direction changes between the magnetic poles of the magnet 210 and each of the comb tooth portions 221 and 231, the rotation resistant force is generated against the main dial 200.

The first magnetic member 220 and the second magnetic member 230 respectively have pairs of arms 222 and 232 extending outward in the radial direction from some comb tooth portions 221 and 231. The pairs of arm portions 222 and 232 are provided so that an arm portion is provided on each side of opposite sides (both sides) with respect to respective central portions of the first magnetic member 220 and the second magnetic member 230. A screw fastening portion is provided at a tip of each of arm portions 222 and 232. The first magnetic member 220 and the second magnetic member 230 are screwed and fixed to the cover member 280 together with the base member 240 by screws inserted into the screw fastening portions while each of the above-described spacer members 260 and 270 is disposed between the screw fastening portions of the first magnetic member 220 and the second magnetic member 230. The spacer members 260 and 270 determine a distance in the axial direction between the first magnetic member 220 and the second magnetic member 230 and determine positions in a direction orthogonal to the axial direction of the first magnetic member 220 and the second magnetic member 230.

In this embodiment, the first magnetic member 220 and the second magnetic member 230 are common components having the same shape, which reduces deviations caused by component tolerance and makes it easy to stabilize the generated rotation resistant force. The shape and fixing method of each magnetic member are not limited to those described above, and examples of other shapes and fixing methods will be described later.

The detector 140 (first magnetic field detector 141 and second magnetic field detector 142) is mounted on a substrate 143. The substrate 143 is screwed to the base member 240 so that the detector 140 is located at a position close to the outer circumferential surface of the magnet 210.

As illustrated in FIG. 3B, the dial unit 20 configured as described above is attached to the top cover 10 from the inside so that a part of the outer circumferential portion of the main dial 200 is exposed (protruded) to the outside from an opening portion 11 provided on the top cover 10. In the vicinity of the opening portion 11, the top cover 10 and each of the base member 240 and the cover member 280 are in close proximity to each other with a gap A in between. The gap A is set to be narrow so that water and dust do not easily enter the inside of the camera 100 through the gap A.

In addition, on an inner side of the gap A (on an opposite side from the opening portion 11), a gap B is provided as a space for providing a sealing member 290 that prevents water and dust having entered through the gap A from further intruding into the inside (blocks the gap B). The sealing member 290 is slightly thicker than the gap B and is made of a material that does not easily allow liquid to pass through.

In the dial unit 20 of this embodiment, the larger the respective diameters and thicknesses of the magnet 210, the first magnetic member 220, and the second magnetic member 230, the stronger the rotation resistant force against the main dial 200. However, if their diameters are to be increased, it is necessary to increase an outer diameter of a bulge portion 12 formed to bulge in an arc shape on the top cover 10, and as a result, an operability of the main dial 200 may be impaired. On the other hand, if their thicknesses are increased, the thickness of the dial unit 20 increases, and it becomes difficult to reduce the size of the camera 100.

Therefore, in this embodiment, the magnet 210, the first magnetic member 220, and the second magnetic member 230 are disposed close to the main dial 200 so that the increase in the thickness of the dial unit 20 is reduced. Here, if sufficient dustproof and drip-proof performance is to be provided by the above-described sealing member 290, the sealing member 290 may have a width of at least 1.0 mm. However, in a case where a sticking surface (fixing surface) for fixing the sealing member 290 is ensured only on a part on the main dial 200 side from the first magnetic member 220 of the base member 240, the first magnetic member 220 is required to be located slightly away from the main dial 200. As a result, the increase in the thickness of the dial unit 20 cannot be reduced well.

Figure 4:
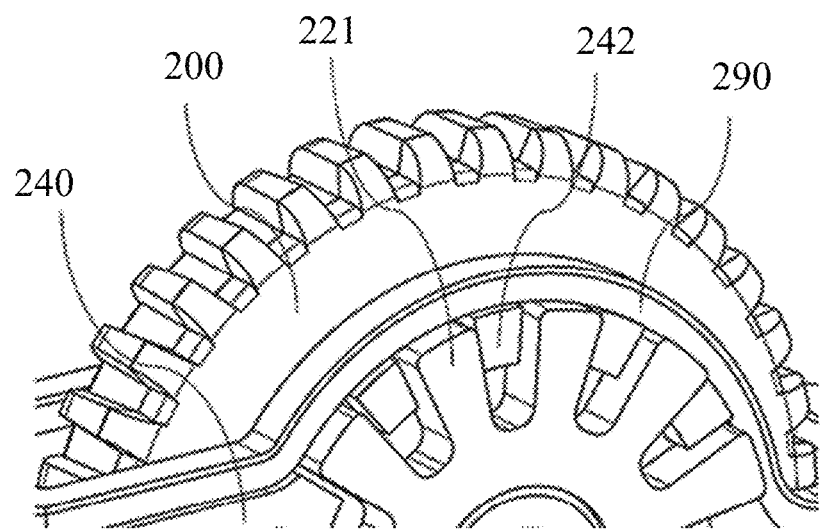
FIG. 4 is a perspective view of the main dial unit according to the first embodiment.

Thus, in this embodiment, as illustrated in FIGS. 3B and 4, a plurality of extending portions 242 are formed on the base member 240, the extending portions 242 extending through between the comb tooth portions 221 of the first magnetic member 220 toward the magnet 210 side. Further, the sticking surface for the sealing member 290 is formed on the extending portions 242 and the part on the main dial 200 side from the first magnetic member 220 of the base member 240. Thereby, the first magnetic member 220 can be disposed sufficiently close to the main dial 200, which makes it possible to acquire good dustproof and drip-proof performance while the thickness of the dial unit 20 is sufficiently reduced.

Figure 7:
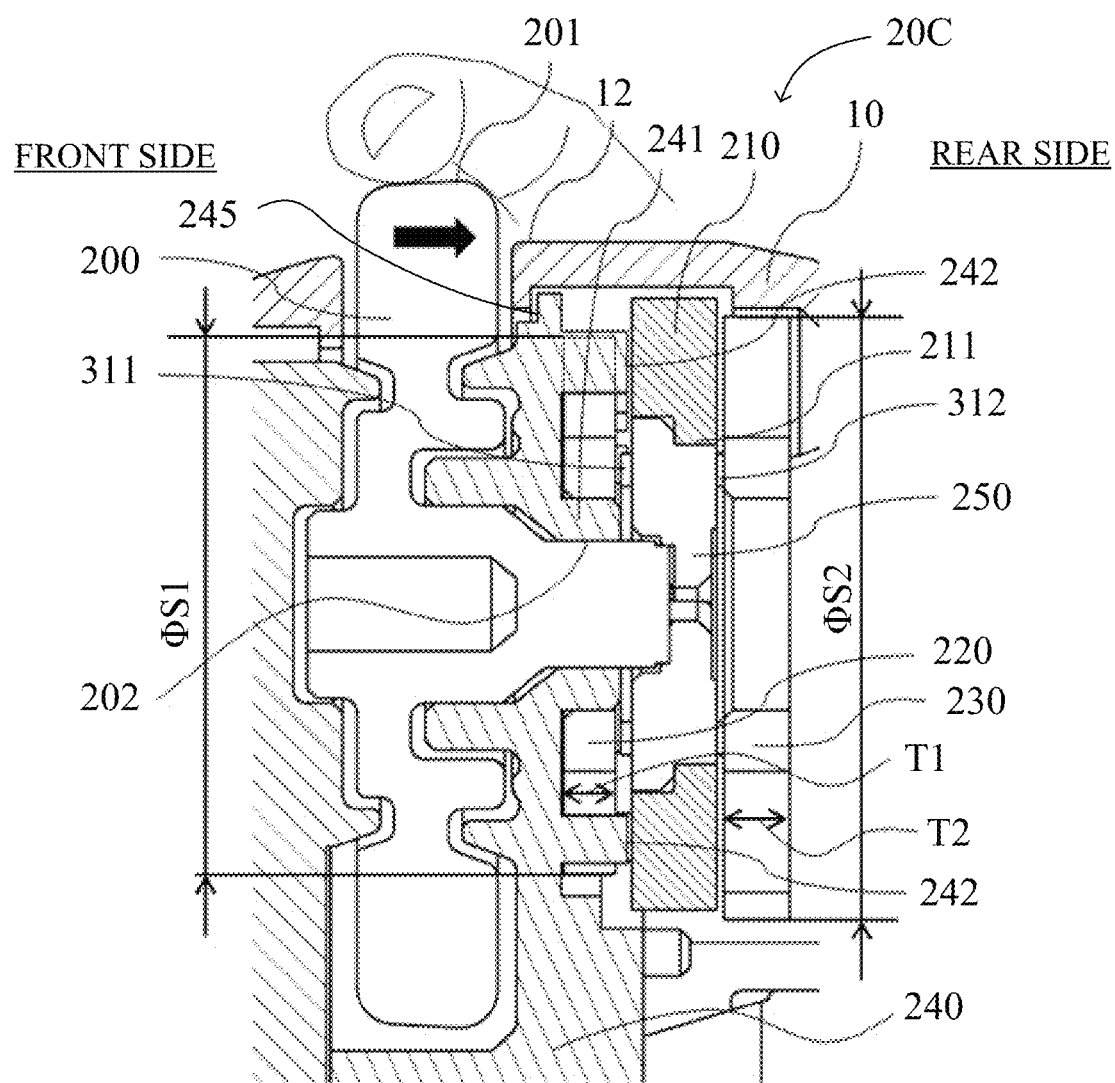
FIG. 7 is a sectional view of a dial unit according to a fourth embodiment.

In this embodiment, a description is given of a case where the sealing member 290 is provided for acquiring dustproof and drip-proof performance. However, instead of providing the sealing member 290, this embodiment may use a configuration as illustrated in FIG. 7. As in FIG. 7, a dustproof and drip-proof effect may be acquired by forming, on the base member 240, a proximal surface (first surface) in close proximity to the top cover 10 with the gap A in between and a blocking surface (second surface) 245 having an angle with the axial direction and facing (blocking) an opening end on the inner side of the gap A. The blocking surface 245 illustrated in FIG. 7 has an angle of about 90° with the axial direction.

In this embodiment, since the magnet 210 is disposed between the first magnetic member 220 and the second magnetic member 230, most of the magnetic flux generated from the magnet 210 flows to each magnetic member, and there is almost no magnetic flux leaking to the outside from the outer circumferential portion of the magnet 210. As a result, even though the magnet 210 is disposed near an exterior surface of the top cover 10, there is almost no effect of the magnetic field such as attracting iron sand.

As described above, according to this embodiment, it is possible to realize a magnetic dial unit 20 having a reduced thickness and good dustproof and drip-proof performance.

Second Embodiment

Figure 5:
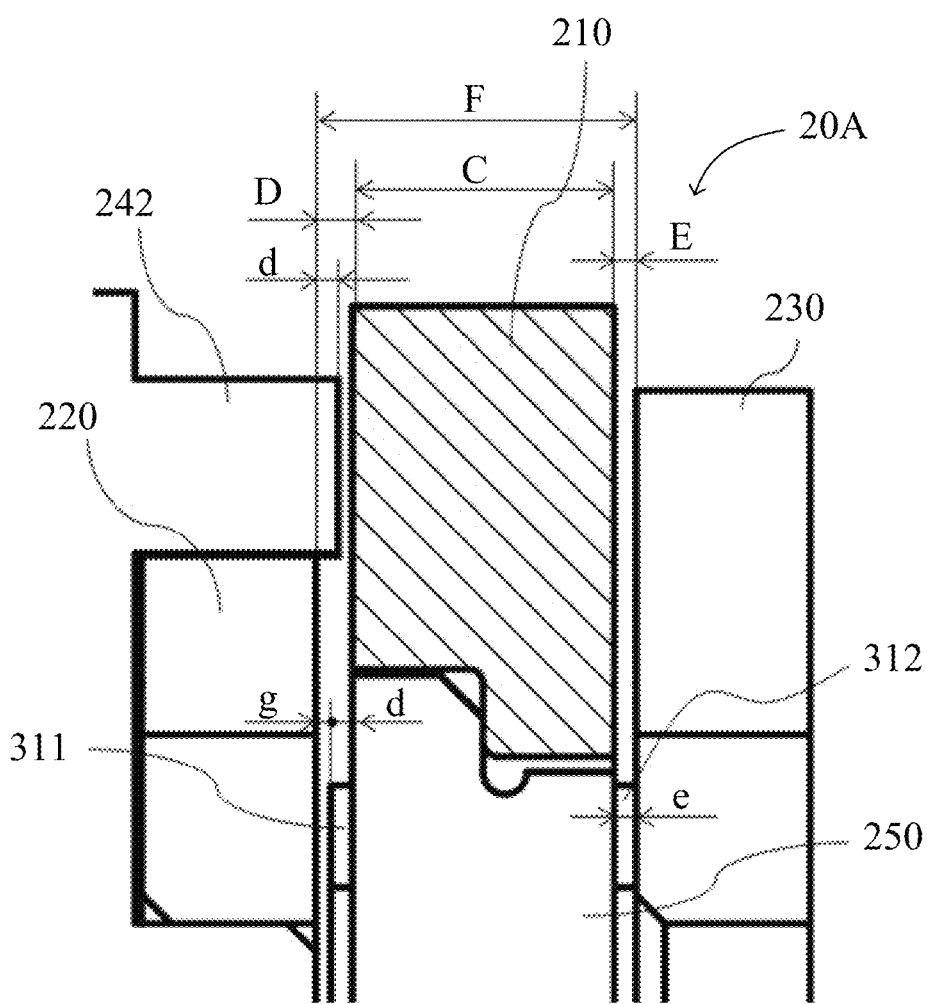
FIG. 5 is a sectional view illustrating a positional relationship between a magnet and a magnetic member of a dial unit according to a second embodiment.

Next, the second embodiment of the present invention is described. FIG. 5 is a section along the rotational center axis of the main dial 200 and illustrates a positional relationship between the magnet 210, the first magnetic member 220, and the second magnetic member 230 in a dial unit 20A according to the second embodiment. Among components in this embodiment, components that are common to the components of the first embodiment are designated by the same reference numerals as those in the first embodiment.

The rotation resistant force against the main dial 200 generated by using the magnetic force is greatly affected by the magnetic flux density generated between the magnet 210 and each magnetic member (220, 230), and it is important to suppress a variation in the magnetic flux density so that the rotation resistant force is stabilized. In JP 2020-87672 described above, it is explained that rotation resistant force is generated by rotating the magnet and changing a positional relationship between the magnet and the magnetic member, but a method for stabilizing the rotation resistant force is not described. On the other hand, this embodiment describes a configuration for stabilizing the rotation resistant force by suppressing the variation in the magnetic flux density.

The magnetic flux density depends on a distance between the magnet 210 and the magnetic member, and the relationship between the magnetic flux density and the distance is non-linear, but the shorter the distance, the higher the magnetic flux density. Therefore, if the rotation resistant force against the main dial 200 is to be stabilized, it is necessary to shorten the distance between the magnet 210 and each magnetic member as much as possible and to manage the distance so that the variation in the magnetic flux density is small.

Therefore, the following configuration may be used while a distance between the first magnetic member 220 and the second magnetic member 230 disposed on the sides of the magnet 210 in the axial direction is fixed by using the spacer members 260 and 270 as described in the first embodiment. As illustrated in FIG. 5, F represents the distance between the first magnetic member 220 and the second magnetic member 230, C represents the thickness of the magnet 210, D represents the distance (gap) between the magnet 210 and the first magnetic member 220, and E represents the distance (gap) between the magnet 210 and the second magnetic member 230. At this time, the distance $F=C+D+E$.

An annular sheet-shaped first spacer member 311 is disposed between the first magnetic member 220 and the magnet 210 so that the gap D is ensured, and an annular sheet-shaped second spacer member 312 is disposed between the second magnetic member 230 and the magnet 210 so that the gap E is ensured. d represents a thickness of the first spacer member 311, e represents a thickness of the second spacer member 312, and g represents a thickness of a gap provided between the first magnetic member 220 and the first spacer member 311, the gap g being provided in consideration of the tolerance of each component. At this time, the relationship is D+E=d+e+g.

The spacer members 311 and 312 may be attached to the magnet holder 250 as illustrated in the drawing or may be attached to the first magnetic member 220 and the second magnetic member 230.

As another configuration example, as illustrated in FIG. 3B, an annular first convex portion 251 and an annular second convex portion 252 may be formed on end surfaces in the axial direction of the magnet holder 250. The gaps D and E can be ensured by making the first convex portion 251 of a convex amount of d face the first magnetic member 220 and the second convex portion 252 of a convex amount of e face the second magnetic member 230. Alternatively, as illustrated in FIG. 5, the extending portion 242 may be protruded from the first magnetic member 220 by d and may be used instead of the first spacer member 311.

In such a configuration, the magnet 210 is movable by the gap g in the axial direction between the first magnetic member 220 and the second magnetic member 230. If the magnet 210 moves in a direction such that the gap D increases by g, the gap E decreases by g, and if the magnet 210 moves in a direction such that the gap D decreases by g, the gap E increases by g. That is, no matter where the magnet 210 is located in the axial direction, an effect of the gap g on the rotation resistant force is canceled out. Therefore, regarding a manufacturing error and a size variation of each component in this configuration, it is only necessary to consider the thicknesses d and e of the spacer members 260 and 270 and the thickness C of the magnet 210, and by managing these accurately, the variation in the rotation resistant force can be reduced.

Third Embodiment

Figure 6:
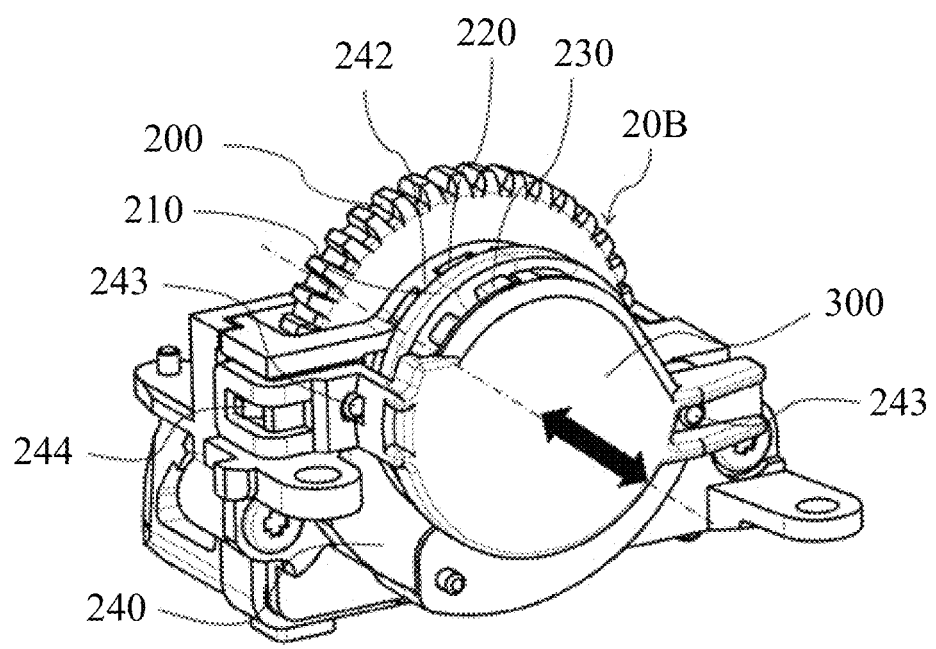
FIG. 6 is a perspective view of a dial unit according to a third embodiment.

Next, a description is given of the third embodiment of the present invention. FIG. 6 illustrates a dial unit 20B having a configuration for stabilizing the rotation resistant force against the main dial 200. Among components of this embodiment, components that are common to the components of the first embodiment are designated by the same reference numerals as those in the first embodiment.

This embodiment differs from the first and second embodiments in that the second magnetic member 230 is attached to the base member 240 via a magnetic member holder 300 that movably holds the second magnetic member 230 in the axial direction (arrow direction in FIG. 6).

The magnetic member holder 300 is not fixed to the base member 240 by a screw or the like, and includes a rotation preventing portion 243 and a retaining portion 244. The rotation preventing portion 243 is engaged with the base member 240 so that the magnetic member holder 300 is prevented from co-rotating with the magnet 210. The retaining portion 244 is engaged with the base member 240 so that the magnetic member holder 300 does not fall off the base member 240 while the magnetic member holder 300 is movable in the axial direction by a predetermined amount relative to the base member 240. In this embodiment, since the magnet 210 and each of the first magnetic member 220 and the second magnetic member 230 are attracted to each other in the axial direction by the magnetic force, it is not necessary to provide the gap g described in the second embodiment, which makes it possible to make the magnet 210 and the first magnetic member 220 closer than those in the second embodiment.

This embodiment sets g=0, and thus the gaps D and E described in the second embodiment are respectively D=d and E=e. The gaps d and e are ensured by the first spacer member 311 and the second spacer member 312 described in the second embodiment, the first convex portion 251 and the second convex portion 252 illustrated in FIG. 3B, or the extending portion 242. Instead of the second spacer member 312, this embodiment may provide an extending portion on the magnetic member holder 300 so as to ensure a gap e, the extending portion protruding toward the magnet 210 through between the comb tooth portions 231 of the second magnetic member 230.

In this embodiment, the gaps D and E between the magnet 210 and the first magnetic member 220 and between the magnet 210 and the second magnetic member 230 are respectively determined only by the thicknesses of the first spacer member 311 and the second spacer member 312 (or alternative configurations). Therefore, it is possible to reduce the variation in the generated rotation resistant force. Further, since the gap g is not provided, the magnetic flux density can be increased and the rotation resistant force against the main dial 200 can be strengthened as compared with the case where the gap g is provided.

Fourth Embodiment

Next, a description is given of the fourth embodiment of the present invention. In a configuration in which the magnet 210 is disposed between the first magnetic member 220 and the second magnetic member 230 as in the first to third embodiments, the magnet 210 is not always maintained so that the magnet 210 is parallel to the first magnetic member 220 and the second magnetic member 230 and is located at a center between them. Actually, the position of the magnet 210 is closer to one magnetic member of the first magnetic member 220 and the second magnetic member 230 than the other, the one magnetic member generating higher magnetic flux density with the magnet 210 and having stronger magnetic force than the other. In addition, an orientation of the magnet 210 is tilted toward a comb tooth portion among the comb tooth portions of the one magnetic member, the comb tooth portion generating strong magnetic force with the magnet 210.

The distance between the magnet 210 and each magnetic member is not constant in the circumferential direction due to variations in planar accuracy and assembly accuracy of each components. In particular, when the main dial 200 is rotationally operated, the distance between the magnet 210 and each magnetic member, that is, a distribution of the magnetic flux density changes, and thereby the position and orientation of the magnet 210 are likely to change. If the position or orientation of the magnet 210 changes, abnormal noise may occur at that moment. JP 2020-87672 described above does not mention a method of managing the position and tilt of the magnet in the axial direction.

On the other hand, this embodiment has a configuration for stabilizing the position and orientation between the first magnetic member 220 and the second magnetic member 230 of the magnet 210 and preventing abnormal noise from occurring during the rotational operation on the main dial 200.

FIG. 7 illustrates a section along the rotational center axis of the main dial 200 of a dial unit 20C according to this embodiment. Among components of this embodiment, components common to the components of first and second embodiments are designated by the same reference numerals as those in the first and second embodiments.

If the position between the first magnetic member 220 and the second magnetic member 230 of the magnet 210 is to be stabilized, it is necessary to determine in advance to which magnetic member side the magnet 210 is shifted. In this embodiment, the main dial 200 is rotationally operated while the index finger of the user's right hand holding the grip portion of the camera is in contact with the operational surface 201 from the slightly front side (left side in the drawing). As a result, the main dial 200 is pushed and shifted from the front side to the rear side (right side in the drawing) of the camera, and therefore the magnet 210 may be configured to be shifted toward the rear side. In addition, in order that the main dial 200 is more easily shifted to the rear side during the rotational operation, the operational surface 201 may be formed in a tilted shape in which a diameter increases from the front side to the rear side and a surface to be contacted with the index finger becomes higher toward the rear side.

In order that the magnet 210 is always shifted to the rear side (second magnetic member 230 side) together with the main dial 200, the magnetic flux density generated between the magnet 210 and the second magnetic member (one magnetic member) 230 may be always higher than the magnetic flux density generated between the magnet 210 and the first magnetic member (the other magnetic member) 220. As described in the second embodiment, the magnetic flux density depends on the distance between the magnet 210 and the magnetic member, and thus the gap E illustrated in FIG. 5 on the rear side to which the magnet 210 is shifted may be narrower than the gap D illustrated in FIG. 5 on the front side and the following inequality may be satisfied.

$D > E$

In a case where the first spacer member 311 having the thickness d and the gap g provided in consideration of the size tolerance of the components are provided in the gap D and the second spacer member 312 having the thickness e is provided in the gap E as in the second embodiment, in order that the magnet 210 is always shifted to the second magnetic member 230 side by the balance of the magnetic force, the following inequality may be satisfied.

$d + g > e$

On the other hand, if the magnetic force does not ensure that the magnet 210 is shifted to the second magnetic member 230 side, in order that the gap E is always narrower than the gap D even if the magnet 210 moves to the first magnetic member 220 side by the gap g, the following inequality may be satisfied.

$d > e + g$

If d, e, and g are set as described above, the position of the magnet 210 is likely to be stable. The same applies to a case where, as illustrated in FIG. 3B, instead of the first spacer member 311 and the second spacer member 312, the magnet holder 250 is provided with the first convex portion 251 having the convex amount of d and the second convex portion 252 having the convex amount of e, and a case where the base member 240 is provided with the extending portion 242 having the protrusion amount of d.

Further, in order that the orientation of the magnet 210 parallel to each magnetic member is stably maintained, it is effective to ensure the gap d at a position as close as possible to the outer side in the radial direction as in the extending portion 242. Alternatively, as described in the third embodiment, an extending portion similar to the extending portion 242 may be provided on the magnetic member holder 300 or the top cover 10 so that the gap e is ensured.

In addition, there are also the following methods as methods for increasing the magnetic flux density on the rear side to which the magnet 210 is shifted. First, as illustrated in FIG. 7, there is a method of making a thickness T2 of the second magnetic member 230 on the rear side thicker than a thickness T1 of the first magnetic member 220 on the front side. Alternatively, there is a method of making an outer diameter $\varphi S2$ of the second magnetic member 230 larger than an outer diameter $\varphi S1$ of the first magnetic member 220 so as to widen an area facing the magnet 210 of the second magnetic member 230.

Further, the larger the area of the surface facing each magnetic member of the magnet 210, the higher the magnetic flux density. Therefore, there is a method of, as illustrated in FIG. 7, providing a flange portion 211 on an inner circumferential portion of the magnet 210 so as to make the area on the surface on the side on which the magnetic flux density is to be increased (the side to which the main dial 200 is shifted) larger than an area of a surface on an opposite side. In FIG. 7, the flange portion 211 is used as an adhesive portion for adhering the magnet 210 to the magnet holder 250. Alternatively, an area of a surface facing the magnet of one magnetic member on the side where the magnetic flux density is to be increased may be made larger than an area of a surface facing the magnet of the other magnetic member on the opposite side.

As described above, this embodiment stabilizes the position and orientation between the first magnetic member 220 and the second magnetic member 230 of the magnet 210, which makes it possible to suppress the generation of abnormal noise during the rotational operation on the main dial 200.

In each of the above embodiments, a description is given of the rotatable operation apparatus to be mounted on the image pickup apparatus, but the rotatable operation apparatus of the present invention can be used in various electronic apparatuses and can be used as a controller in a game machine, an operation unit in an in-vehicle electronic apparatus, or the like.

According to each of the above embodiments, it is possible to provide an electronic apparatus having a rotatable operation member and good dustproof and drip-proof performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-092764, filed on Jun. 2, 2021, which is hereby incorporated by reference herein in its entirety.

What is claimed is:

1. An electronic apparatus comprising:
   a rotatable operation member that can be rotationally operated;
   a base member configured to rotatably hold the rotatable operation member;
   a magnet in which N poles and S poles are alternately magnetized in a rotational direction, the magnet being rotatable integrally with the rotatable operation member; and a first magnetic member and a second magnetic member disposed so that the magnet is disposed between them in an axial direction in which a rotational center axis of the rotatable operation member extends, each of the first magnetic member and the second magnetic member having a plurality of comb tooth portions radially extending outward in a radial direction from a center, wherein in the axial direction, the first magnetic member, the magnet, and the second magnetic member are disposed on an opposite side of the base member from the rotatable operation member, wherein a part of an outer circumferential portion of the rotatable operation member is exposed to an outside from an opening provided on an exterior member of the electronic apparatus, and wherein the magnet, the first magnetic member, and the second magnetic member are covered with the exterior member.

2. The electronic apparatus according to claim 1, wherein the base member includes:

a first surface that is in close proximity to the exterior member with a gap formed between the first surface and the exterior member, the gap being connected to the opening; and a second surface facing an opening end of the gap, the opening end being on an opposite side from the opening.

3. The electronic apparatus according to claim 1, wherein the base member is in close proximity to the exterior member with a gap formed between the base member and the exterior member, the gap being connected to the opening, and wherein a sealing member that blocks the gap is disposed between the base member and the exterior member.

4. The electronic apparatus according to claim 3, wherein the base member includes an extending portion extending through between the plurality of comb tooth portions of the first magnetic member, and wherein at least a part of the sealing member is fixed to the extending portion.

5. The electronic apparatus according to claim 1, wherein the first magnetic member and the second magnetic member are fixed to the base member while a spacer member is disposed between the first magnetic member and the second magnetic member, the spacer member determining a distance in an axial direction between the first magnetic member and the second magnetic member.

6. The electronic apparatus according to claim 5, wherein the spacer member is provided on each of sides opposite to each other with respect to the rotational center axis.

7. The electronic apparatus according to claim 5, wherein the spacer member determines the distance and positions of the first magnetic member and the second magnetic member in a direction orthogonal to the axial direction.

8. The electronic apparatus according to claim 1, further comprising a magnetic member holder configured to hold the second magnetic member, prevented from rotating in the rotational direction with respect to the base member, and movable by a predetermined amount in the axial direction.

9. The electronic apparatus according to claim 1, further comprising a magnet holder configured to hold the magnet, wherein the magnet holder includes a convex portion for providing a gap between the magnet and at least one of the first magnetic member and the second magnetic member.

10. The electronic apparatus according to claim 1, further comprising an extending portion that protrudes through between the plurality of comb tooth portions of the first magnetic member toward the magnet, wherein the extending portion provides a gap between the first magnetic member and the magnet.

11. The electronic apparatus according to claim 8, wherein the magnetic member holder includes an extending portion that protrudes through between the plurality of comb tooth portions of the second magnetic member toward the magnet, wherein the extending portion provides a gap between the second magnetic member and the magnet.

12. The electronic apparatus according to claim 1, wherein a spacer member is disposed between the magnet and at least one magnetic member of the first magnetic member and the second magnetic member, the spacer member providing a gap between the one magnetic member and the magnet.

13. The electronic apparatus according to claim 1, wherein a gap between the magnet and one magnetic member of the first magnetic member and the second magnetic member is narrower than a gap between the magnet and the other magnetic member, the one magnetic member being on a side to which the rotatable operation member having been rotationally operated is shifted in the axial direction.

14. The electronic apparatus according to claim 1, wherein a thickness in the axial direction of one magnetic member of the first magnetic member and the second magnetic member is larger than a thickness in the axial direction of the other magnetic member, the one magnetic member being on a side to which the rotatable operation member having been rotationally operated is shifted in the axial direction.

15. The electronic apparatus according to claim 1, wherein an outer diameter of one magnetic member of the first magnetic member and the second magnetic member is larger than an outer diameter of the other magnetic member, the one magnetic member being on a side to which the rotatable operation member having been rotationally operated is shifted in the axial direction.

16. The electronic apparatus according to claim 1, wherein an area of a surface facing one magnetic member of the first magnetic member and the second magnetic member of the magnet is larger than an area of a surface facing the other magnetic member of the magnet, the one magnetic member being on a side to which the rotatable operation member having been rotationally operated is shifted in the axial direction.

17. The electronic apparatus according to claim 1, wherein an area of a surface facing the magnet of one magnetic member of the first magnetic member and the second magnetic member is larger than an area of a surface facing the magnet of the other magnetic member, the one magnetic member being on a side to which the rotatable operation member having been rotationally operated is shifted in the axial direction.

18. The electronic apparatus according to claim 1, wherein the rotatable operation member has an operational surface that receives a rotational operation, and the operational surface has a tilted shape in which a diameter increases toward one magnetic member of the first magnetic member and the second magnetic member, the one magnetic member being on a side to which the rotatable operation member having been rotationally operated is shifted in the axial direction.

* * * * *